UNITED STATES PATENT OFFICE.

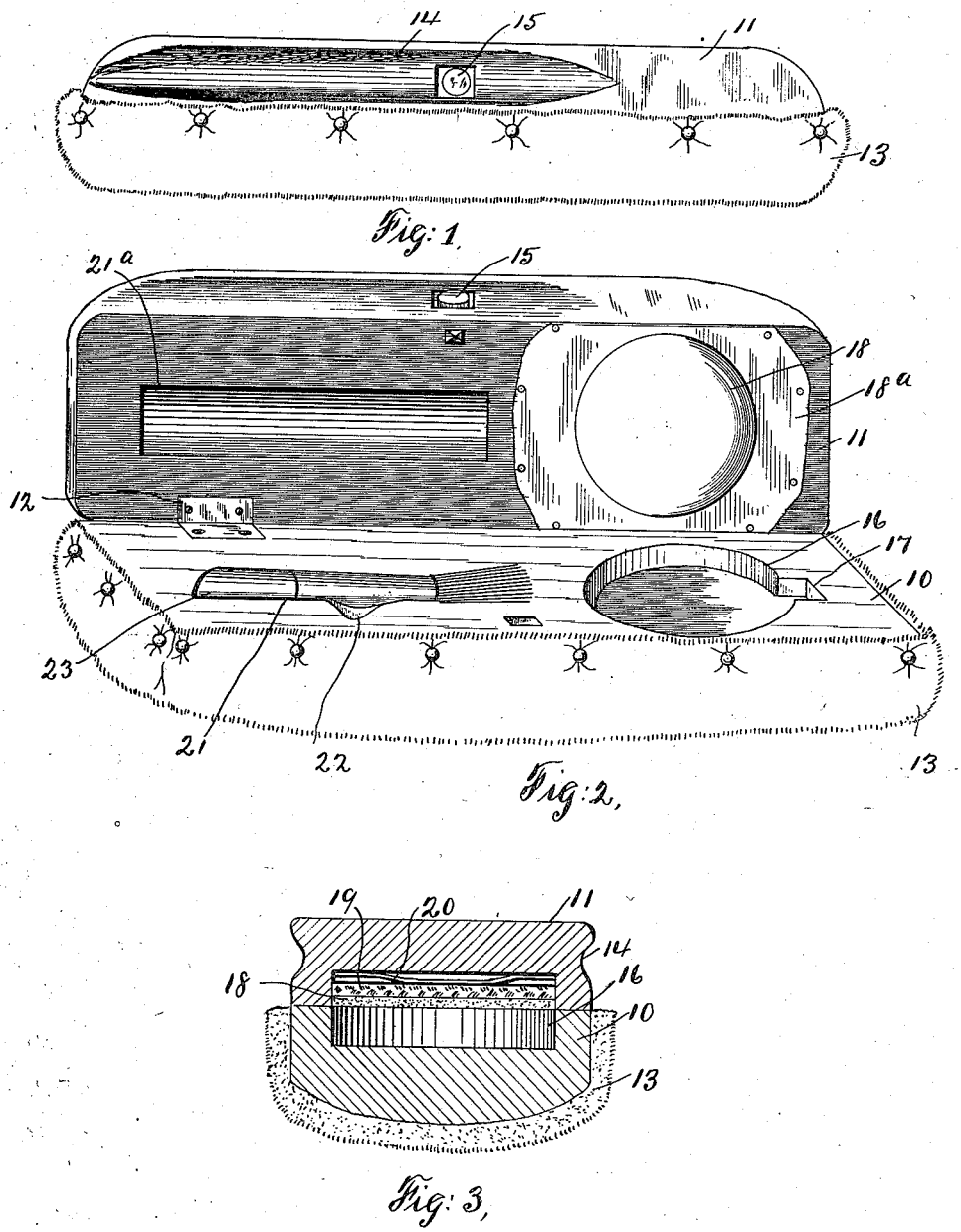
G. W. KELLY.
BLACKING SET.
APPLICATION FILED JULY 26, 1912.
1,062,339.  Patented May 20, 1913.
George W. Kelly, Inventor.

GEORGE W. KELLY, OF ELIZABETH, NEW JERSEY.

BLACKING SET.

1,062,339.

Specification of Letters Patent.

Patented May 20, 1913.

Application filed July 26, 1912. Serial No. 711,743.

*To all whom it may concern:*

Be it known that I, GEORGE W. KELLY, of Elizabeth, Union county, New Jersey, have invented a new and useful Improvement in Blacking Sets, of which the following is a full, clear, and exact description.

My invention relates to improvements in blacking sets.

Generally shoe blacking is contained in boxes, and the dauber and brush are separate devices which are likely to be displaced, and moreover the lid of the blacking box becomes dirty and can only be handled by soiling the fingers, while often it is lost and the blacking becomes unfit for use.

The object of my invention is to produce a simple device in the form of a case which can be readily opened and closed, and which contains a socket adapted to carry a box of blacking with the lid removed, and the case also contains a pad on the opposite member of the case which serves as a cover for the blacking box when the case is closed, and which can if desired be made to keep the blacking moist or oiled as hereinafter described. This pad is resilient and affords a tight closure for the blacking box, and also keeps the box from being displaced.

In connection with the foregoing, I also provide a socket in the case for holding a dauber. I also construct the case so that one member can be conveniently grasped in the hand, and the lower member is covered with felt, cloth, or equivalent. substance so that it can be conveniently used as a polisher. Preferably I have the two parts of the case hinged together at the side edges, but they can be hinged at the end, or they can be fastened together in any convenient manner.

It will be seen, therefore, that by my invention I have the blacking and dauber always ready for use, the blacking is kept from soiling other things and in good condition for the shoes, the dauber is handy for instant use, and the case itself serves as a polisher. Moreover, the whole device can be very easily slipped into a traveling bag or carried in any manner where it can be conveniently had for use.

Reference is to be had to the accompanying drawings forming a part of this specification, in which similar reference characters indicate corresponding parts in all the views.

Figure 1 is a side elevation of the device embodying my invention. Fig. 2 is a perspective view of the open case with the blacking box removed, and Fig. 3 is a cross section through the blacking holding part of the case.

The case comprises lower and upper members 10 and 11 which meet at the edges, and can meet throughout the greater part of their surface if desired, the two members being preferably hinged at one edge as shown at 12, though they can be otherwise connected if desired. One member of the case is provided with a covering 13, which can be felt, cloth, or any suitable substance to adapt the device for use as a polisher, and the other member has its sides preferably concaved as shown at 14 so that it can be conveniently grasped by the fingers. The two parts are held together by a suitable catch 15. In one member of the case is a socket 16 which is of the right size to hold an ordinary commercial box of blacking with the lid removed, and I have shown an offset 17 in this socket, as some forms of boxes have this offset on the side. Obviously, however, the socket can be made to fit any desired form or size of box.

When the box of blacking is inserted in the socket 16, the lid is removed and thrown away, and the cover to the blacking box is formed by the pad 18 which can be of leather, rubber, or any suitable substance, and which as shown in Fig. 2 is large enough to extend over a part of the surface of the member 11, to which it is tacked or otherwise secured. The pad portion 18 should fit snugly over the socket 16 so as to form a secure cover for the box of blacking which may be therein, and the pad prevents the blacking from being accidentally removed, and if the pad is moistened or oiled, it will serve to keep the blacking in good condition. The pad 18 should be resilient so as to close snugly over the blacking in the socket 16, and in Fig. 3 I have shown the pad made of felt which is well adapted to receive and hold oil or other moistening substance, and this is backed by a cushion 19 and a spring 20. Obviously the spring or cushion can be used separately, and in fact the spring forms a good cushion, and the space back of the pad can be filled with hair, excelsior, cotton, wool, or any resilient stuffing.

In the member 10 of the case I provide a socket 21 adapted to receive and hold snugly a dauber 23, and the edge of the socket is recessed as at 22 so that the fingers can readily grip the dauber. I preferably provide in the opposite member 11 of the case a socket 21ᵃ which fits over a portion of the dauber 23 and holds the latter secure when the case is closed.

From the foregoing description it will be seen that a box of blacking can be readily placed in the socket 16, its lid removed, a dauber placed in the socket 21, and that when the case is closed, both blacking and dauber are securely held and in such a manner that they will not soil any other objects with which the case may come in contact. It will be observed further, that the device holds the blacking where it can always be found, that it is kept ready for use and can be conveniently used, while the case itself affords an excellent polisher.

While my invention is especially adapted for use as a blacking set for shoes, it will of course be understood that the case can be made to hold polish and a dauber or brush for other purposes than shoes, without affecting the principle of the invention.

I claim:—

1. As an improved article of manufacture, a blacking set comprising a two-part case, one part having means for holding a box of blacking, and the opposite part having a pad adapted to fit over and cover the said blacking box.

2. As an improved article of manufacture, a blacking set comprising a two-part casing, one part having therein a socket shaped to hold a blacking box, and the opposite part having a yielding pad adapted to fit over and cover the said blacking box.

GEORGE W. KELLY.

Witnesses:
JOHN J. SCOTT,
SAMUEL R. OGDEN.